(12) United States Patent
Lin (10) Patent No.: US 12,516,789 B2
(45) Date of Patent: Jan. 6, 2026

(54) LUMINOUS FRAME ASSEMBLY

(71) Applicant: Huazhi Zhao, Guangdong (CN)

(72) Inventor: Haiqun Lin, Guangdong (CN)

(73) Assignee: Huazhi Zhao, Shenzhen (CN)

(*) Notice: Subject to any disclaimer, the term of this patent is extended or adjusted under 35 U.S.C. 154(b) by 0 days.

(21) Appl. No.: 19/084,720

(22) Filed: Mar. 19, 2025

(65) Prior Publication Data

US 2025/0216043 A1    Jul. 3, 2025

(30) Foreign Application Priority Data

Mar. 22, 2024  (CN) .......................... 202410335207.8

(51) Int. Cl.

| | |
|---|---|
| *F21S 10/00* | (2006.01) |
| *A63B 63/00* | (2006.01) |
| *A63B 67/06* | (2006.01) |
| *F21V 23/04* | (2006.01) |
| *F21V 33/00* | (2006.01) |

(52) U.S. Cl.
CPC ............ *F21S 10/005* (2013.01); *A63B 67/06* (2013.01); *F21V 23/0485* (2013.01); *F21V 33/008* (2013.01); *A63B 63/00* (2013.01); *A63B 2225/74* (2020.08); *F21V 2200/15* (2015.01)

(58) Field of Classification Search
CPC ..... A63B 67/06; A63B 63/00; F21Y 2107/20; F21Y 2107/30; F21S 8/081; F21S 8/083; F21S 10/005; F21V 2200/10; F21V 2200/13; F21V 2200/15; F21V 2200/17; G02B 6/0005; G02B 6/0006; G02B 6/0008; G02B 6/001

See application file for complete search history.

(56) References Cited

U.S. PATENT DOCUMENTS

| | | | | |
|---|---|---|---|---|
| 4,783,726 A | * | 11/1988 | Wang | ...................... F21K 9/232 439/642 |
| 5,358,255 A | * | 10/1994 | Jolson | .................... A63B 67/06 273/400 |
| 6,494,455 B1 | * | 12/2002 | Headrick | ............... A63B 63/00 273/400 |

(Continued)

FOREIGN PATENT DOCUMENTS

| | | | | |
|---|---|---|---|---|
| CN | 218833521 U | | 4/2023 | |
| KR | 20240039883 A | * | 3/2024 | ........... A01K 85/015 |
| WO | WO-2020096747 A1 | * | 5/2020 | ............... A63B 9/00 |

*Primary Examiner* — Alexander K Garlen (57) ABSTRACT

A luminous frame assembly includes a support frame and a pod light device. The pod light device includes a housing, light guide bars, and an electronic assembly. The light guide bars are connected to the housing at intervals along a radial direction, with each light guide bar having at least one curved portion, and one end of each light guide bar protruding downward from the housing. The electronic assembly includes a main board and light-emitting components, with some of the light-emitting components facing a top of the housing and others being connected to the light guide bars. When the light-emitting components emit light, a unique visual effect is produced, and the chains and the entire receiving basket are illuminated for providing a clear target to facilitate nighttime play or sports, thereby improving user experience and practicality.

10 Claims, 10 Drawing Sheets

(56) References Cited

U.S. PATENT DOCUMENTS

| | | | |
|---|---|---|---|
| 2004/0047144 A1* | 3/2004 | Chi-Cheng | A63H 27/10 |
| | | | 362/124 |
| 2005/0174769 A1* | 8/2005 | Yong | F21K 9/232 |
| | | | 362/249.05 |
| 2005/0282665 A1* | 12/2005 | Tarng | A63B 59/30 |
| | | | 473/588 |
| 2015/0345777 A1* | 12/2015 | Bien | F21L 4/02 |
| | | | 362/183 |
| 2016/0279494 A1 | 9/2016 | Paul | |
| 2024/0044474 A1* | 2/2024 | Wyss | F21V 3/02 |

\* cited by examiner

LUMINOUS FRAME ASSEMBLY

CROSS REFERENCE TO RELATED APPLICATIONS

The present application claims the benefit of Chinese Patent Application No. 202410335207.8 filed on Mar. 22, 2024, the contents of which are incorporated herein by reference in their entirety.

FIELD OF THE INVENTION

The present invention relates to the field of sports equipment, and particularly to a luminous frame assembly as a game target.

BACKGROUND OF THE INVENTION

Throwing sports are widely present in various sports activities and daily life. Common throwing activities in daily life, such as flying disc, disc golf, sandbag, and ball throwing, are popular and highly entertaining. Throwing actions generally include throwing for distance and throwing for accuracy. Throwing for distance mainly involves throwing the object as far as possible, which is a speed-based strength action requiring a powerful force. Throwing for accuracy, on the other hand, requires muscle strength and good visual estimation ability to throw the object into a target basket or a target container, with a higher demand for the accuracy of the action.

For example, a flying disc game usually involves using the strength of the fingers and wrist to make it spin and fly in the air. To improve the accuracy of flying disc throwing and make it easier to retrieve the thrown flying disc, a frame assembly as a target is generally equipped with a basket for slowing and trapping a flying disc thrown against the basket. However, the existing frame assembly has no lighting device and can only be used during the day, which are not applicable to use at night or in low-light environments.

Therefore, there is a need to provide a luminous frame assembly to solve the above-mentioned issues.

SUMMARY OF THE INVENTION

The purpose of the present invention is to provide a luminous frame assembly to facilitate nighttime play or sports, thereby improving user experience and practicality.

In order to achieve the purpose mentioned above, the present invention provides a luminous frame assembly including a support frame and a pod light device mounted at a top of the support frame. The pod light device includes a housing, which is of a hollow structure; light guide bars, connected to the housing at intervals along a radial direction of the housing, with each of the light guide bars having at least one curved portion, and one end of each of the light guide bars, away from the housing, protruding downward from the housing; and an electronic assembly, including a main board and a plurality of light-emitting components installed on the main board, the main board and the light-emitting components being housed within the housing, with some of the light-emitting components facing a top of the housing and others being connected to the light guide bars.

As a preferable embodiment, each of the light guide bars includes a first end, a second end, and the at least one curved portion located between the first and second ends, one of the first and second ends is connected to the housing, the other of the first and second ends is protruded downward from the housing, and the at least one curved portion is protruded upward from the housing. In such a way, the multiple light guide bars protrude upward from the housing and then droop downward. When the light-emitting components emit light, a unique visual effect is produced, and the drooping light guide bars can illuminate the chains and the entire receiving basket.

As a preferable embodiment, the light guide bars form an octopus-like shape as a whole. When the light-emitting components emit light, a unique visual effect is produced, thus the luminous frame assembly is highlighted as a clear target, and the fun of playing or exercising is increased.

As a preferable embodiment, one end of each of the light guide bars is connected to a connector for accommodating the light-emitting components, the connector is provided with an engagement part extending radially, and the engagement part is engaged with the housing. The connector not only facilitates the installation of the flexible light guide bar but also makes it easier to connect the light guide bar with the light-emitting component, making the assembly of the pod light device of the present invention more convenient.

As a preferable embodiment, the electronic assembly further includes a sensor housed within the housing and electrically connected to the main board, the sensor is configured to detect at least one of vibration, sound, light, and image, and the main board is configured to control the light-emitting components to change a light-emitting mode based on a detection signal from the sensor. By detecting the vibration of the support frame or external factors such as sound, light, and images, the light-emitting components are controlled to change the light-emitting modes based on the detection results, thereby increasing the fun.

As a preferable embodiment, the sensor includes at least one of a vibration sensor, a sound sensor, a photoelectric sensor, and a visual sensor. These sensors are housed within the housing and electrically connected to the main board, and the main board is configured to control the light-emitting components to change the light-emitting modes based on the detection signals from at least one of these sensors. For example, under normal circumstances, the main board controls the light-emitting components to emit green light. When an object is thrown into the receiving basket, it will cause the support frame to vibrate. At this time, the vibration sensor detects the vibration and outputs a detection signal to the main board. The main board can then control the light-emitting components to switch to red light emission, thereby increasing the fun.

As a preferable embodiment, the light-emitting modes of the light-emitting components include at least one of on/off, color change, flashing patterns, and duration of light emission.

As a preferable embodiment, the electronic assembly further includes a rechargeable battery and a charging socket, the rechargeable battery is housed within the housing and electrically connected to the main board, the charging socket is housed within the housing and electrically connected to the rechargeable battery, and a charging interface of the charging socket is exposed outside the housing. By this charging interface, the rechargeable battery can be charged. In such a way, it allows the entire luminous frame assembly to be carried outdoors for activities or games, thereby expanding the range of usage scenarios and enhancing its practicality.

As a preferable embodiment, the housing includes a base, a middle cover, and a lampshade connected in sequence, each of the light guide bars is engaged between the base and the middle cover, the main board is housed between the base and the middle cover, with some of the light-emitting components facing the lampshade.

As a preferable embodiment, a connection position of the base and the middle cover is provided with a plurality of through holes along the radial direction, each of the light guide bars is inserted through a respective through hole.

As a preferable embodiment, the base is provided with a plurality of supports evenly distributed along the radial direction, each of the supports is provided with a groove in which each of the light-emitting components is engaged, one end of each of the light-emitting components is protruded from the support and connected to the light guide bar.

As a preferable embodiment, it further includes a bottom support frame, a support pole mounted on the bottom support frame, a receiving basket and a top support frame respectively mounted on the support pole, and a plurality of chains connected between the top support frame and the support pole, wherein a connection position between the chains and the support pole is not lower than the receiving basket, and the housing is mounted at a top of the support pole.

As a preferable embodiment, at least a top of the support pole is hollow, a bottom of the housing is protruded with an insertion end, with the insertion end being inserted into the top of the support pole and tightly fitted therewith.

Compared with the prior art, the luminous frame assembly of the present invention includes a support frame and a pod light device mounted at the top of the support frame. Specifically, the pod light device includes a housing, light guide bars, and an electronic assembly. The housing has a hollow structure, and multiple light guide bars are connected to the housing at intervals along the radial direction. Each light guide bar has at least one curved portion, and the end of each light guide bar, away from the housing, is bended downward, forming a drooping shape. The electronic assembly includes a main board and multiple light-emitting components installed on the main board. The main board and the light-emitting components are housed within the housing, with some of the light-emitting components facing the top of the housing and others being connected to the respective light guide bars. When the light-emitting components emit light, the light guide bars produce a luminous effect, creating a unique and eye-catching visual effect. The light from the light guide bars illuminates the receiving basket and the chains on the support frame, and the light is reflected by the chains, producing an eye-catching visual effect. In such a way, the luminous frame assembly forms a clear and visual target, enhancing the fun of games or sports, which is especially suitable for nighttime or low-light environments, thereby improving user experience and practicality.

DETAILED DESCRIPTION OF ILLUSTRATED EMBODIMENTS

The embodiments of the present invention will be described with reference to the accompanying drawings, in which similar reference numerals denote similar elements. It should be noted that the directional descriptions involved in the present invention, such as up, down, left, right, front, and back, indicate the directional or positional relationships based on the directions or positions shown in the drawings. These descriptions are merely for the convenience of describing the technical solutions of the present application and/or simplifying the description, and should not be understood as limitations to the present application. The first, second, etc., mentioned in the description are only used to distinguish technical features and should not be understood as indicating or implying relative importance or implying the sequence of the technical features indicated.

Firstly, as shown in FIGS. 1 to 11, the luminous frame assembly 1 provided in the present invention is particularly suitable for places such as courtyards and outdoors, facilitating throwing games or sports in low-light or nighttime environments, such as flying disc games. The luminous frame assembly 1 provides a clear nighttime target for throwing games or sports, facilitating users to play or exercise in the dark or low-light conditions, thereby improving user experience. However, the luminous frame assembly 1 is not limited to the aforementioned application environments, but it's also applicable to any other scenarios and also can be used without emitting light in well-lit conditions.

As shown in FIGS. 1 to 11, in the present invention, the luminous frame assembly 1 includes a support frame 200 and a pod light device 100 mounted at the top of the support frame 200. The pod light device 100 includes a housing 110, light guide bars 120, and an electronic assembly 130. The housing 110 is a hollow structure. Multiple light guide bars 120 are connected to the housing 110 at intervals along a radial direction of the housing 110. Each light guide bar 120 has at least one curved portion, and the end of each light guide bar 120, away from the housing 110, protrudes downward from the housing 110, causing each light guide bar 120 to form a drooping state. The electronic assembly 130 includes a main board 131 and multiple light-emitting components electrically connected to the main board 131. The main board 131 and the light-emitting components are housed within the housing 110, with some of the light-emitting components facing the top of the housing 110 and others being connected to the respective light guide bars 120. When the light-emitting components emit light, both the housing 110 and the light guide bars 120 produce a luminous effect, thereby illuminating the entire support frame 200, and facilitating games or sports in low-light environments.

Figure 1:
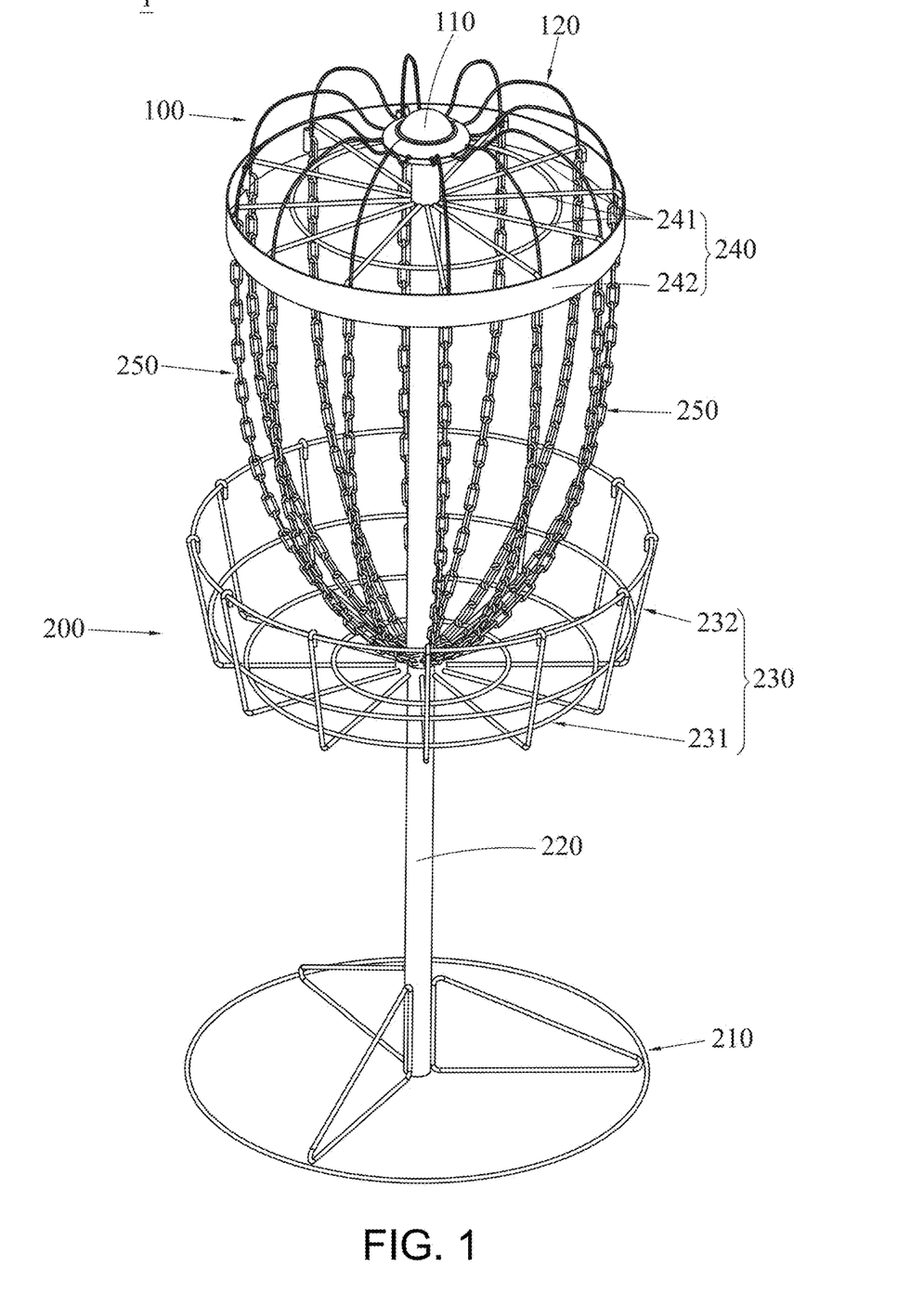
FIG. 1 is a structural diagram of the luminous frame assembly according to an embodiment of the present invention.
Figure 2:
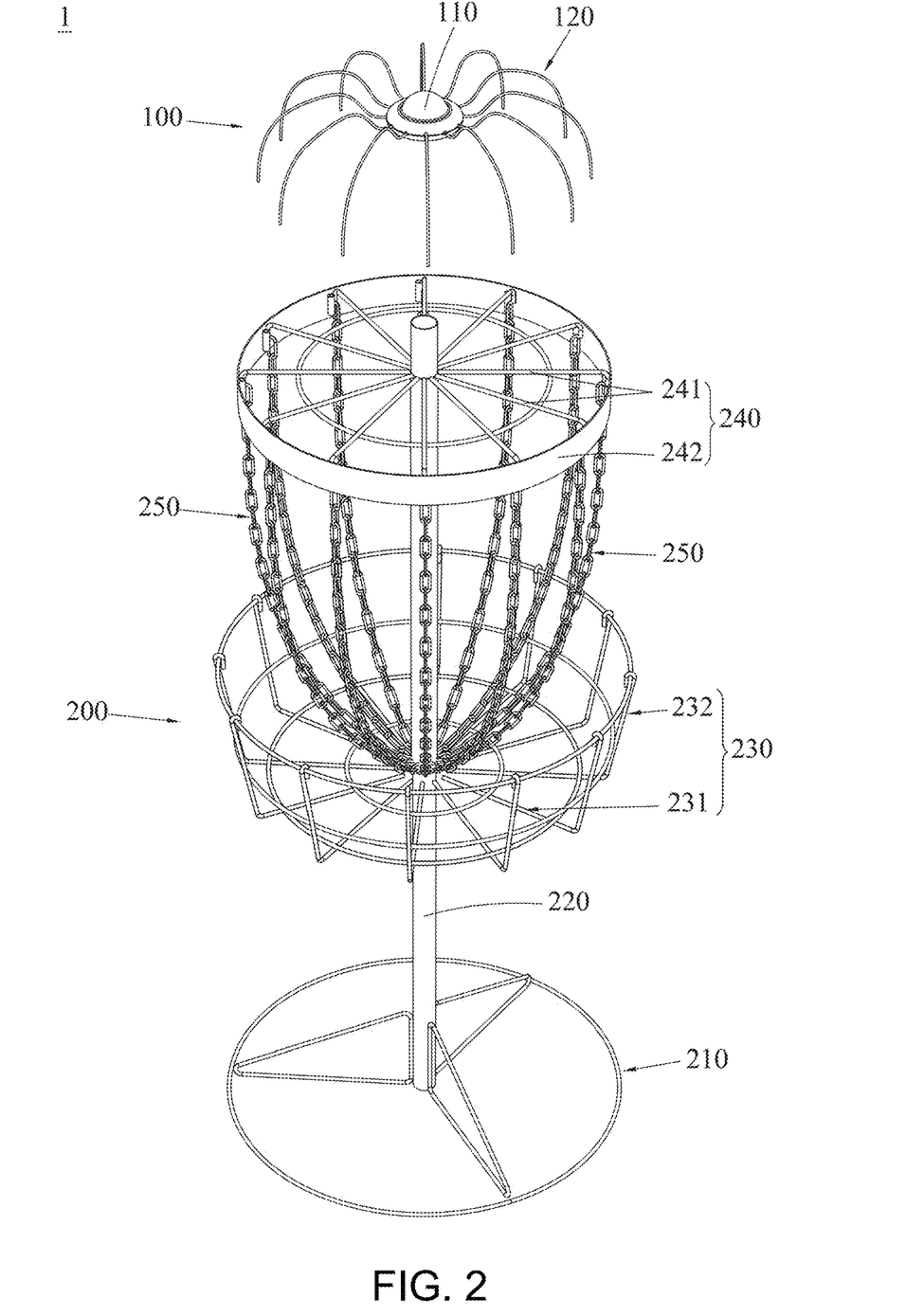
FIG. 2 is an exploded view of FIG. 1.

Referring to FIGS. 1 to 4 and FIG. 8, in one embodiment of the present invention, each light guide bar 120 includes a first end 121, a second end 122, and at least one curved portion 123 connecting with the first and second ends 121, 122. One of the first and second ends 121 and 122 is connected to the housing 110, while the other is protruded downward from the housing 110, and at least one curved portion 123 is protruded upward from the housing 110. For example, in a specific embodiment, each light guide bar 120 includes one curved portion 123, and both the first end 121 and second end 122 are curved. The first end 121 is connected to the housing 110, the curved portion 123 is protruded upward from the housing 110, and the second end 122 is curved downward, as shown in FIGS. 1 and 2. In this specific embodiment, after multiple light guide bars 120 are uniformly installed along the radial direction of the housing 110, they form an octopus-like shape with the housing 110 as a whole. Optionally, the shape of the light guide bars 120 and the housing 110 is not limited to that. After the pod light device 100 is mounted at the top of the support frame 200, the multiple light guide bars 120 protrude upward from the housing 110 and then droop downward, as shown in FIG. 1. When the light-emitting components emit light, a unique visual effect is produced, and the drooping light guide bars 120 can also illuminate the chains 250 and the entire receiving basket 230 (described later), thus a clear target for the luminous frame assembly 1 is highlighted, and the fun of playing or exercising is increased.

Figure 3:
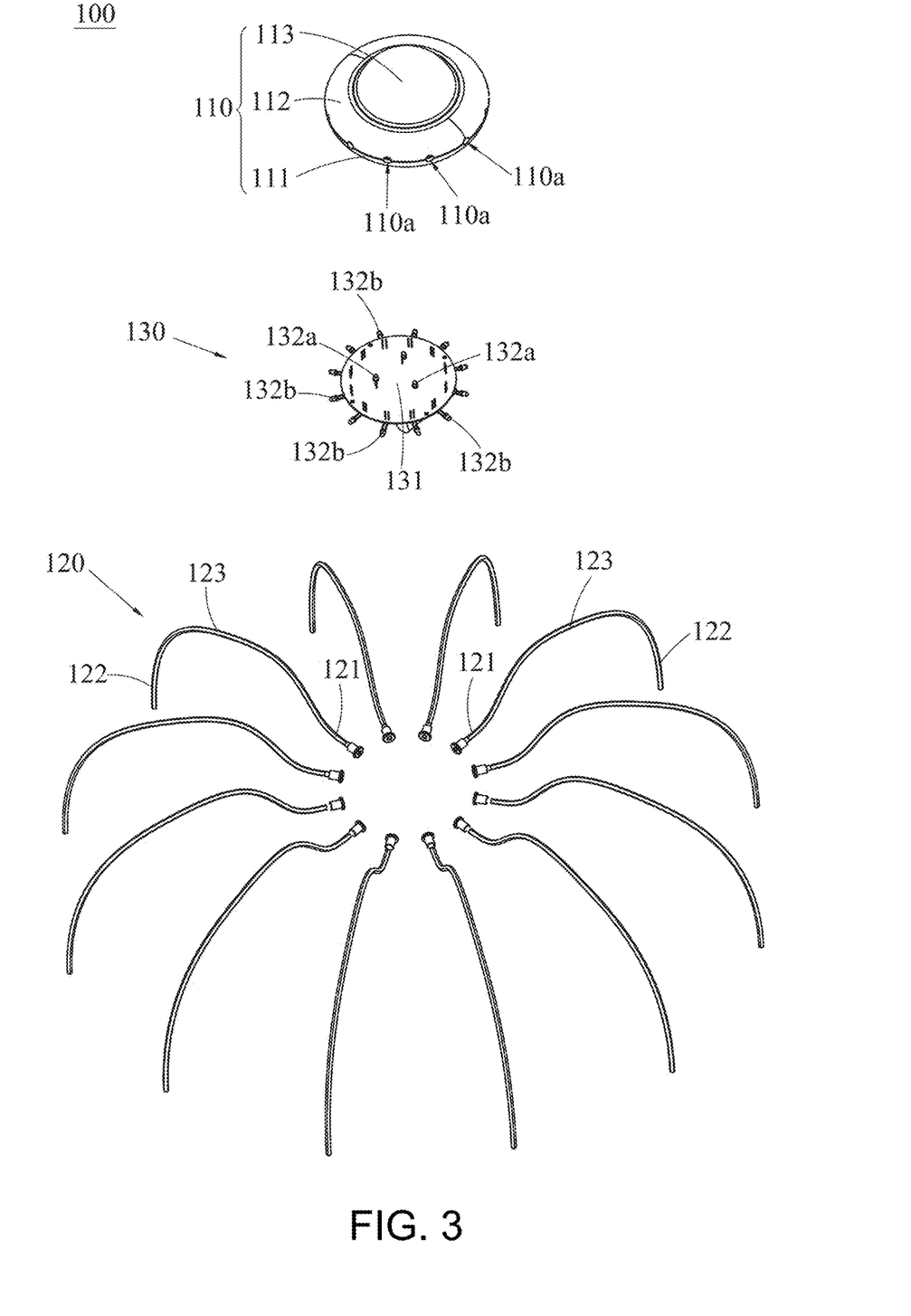
FIG. 3 is an exploded view of the pod light device in FIG. 2.
Figure 4:
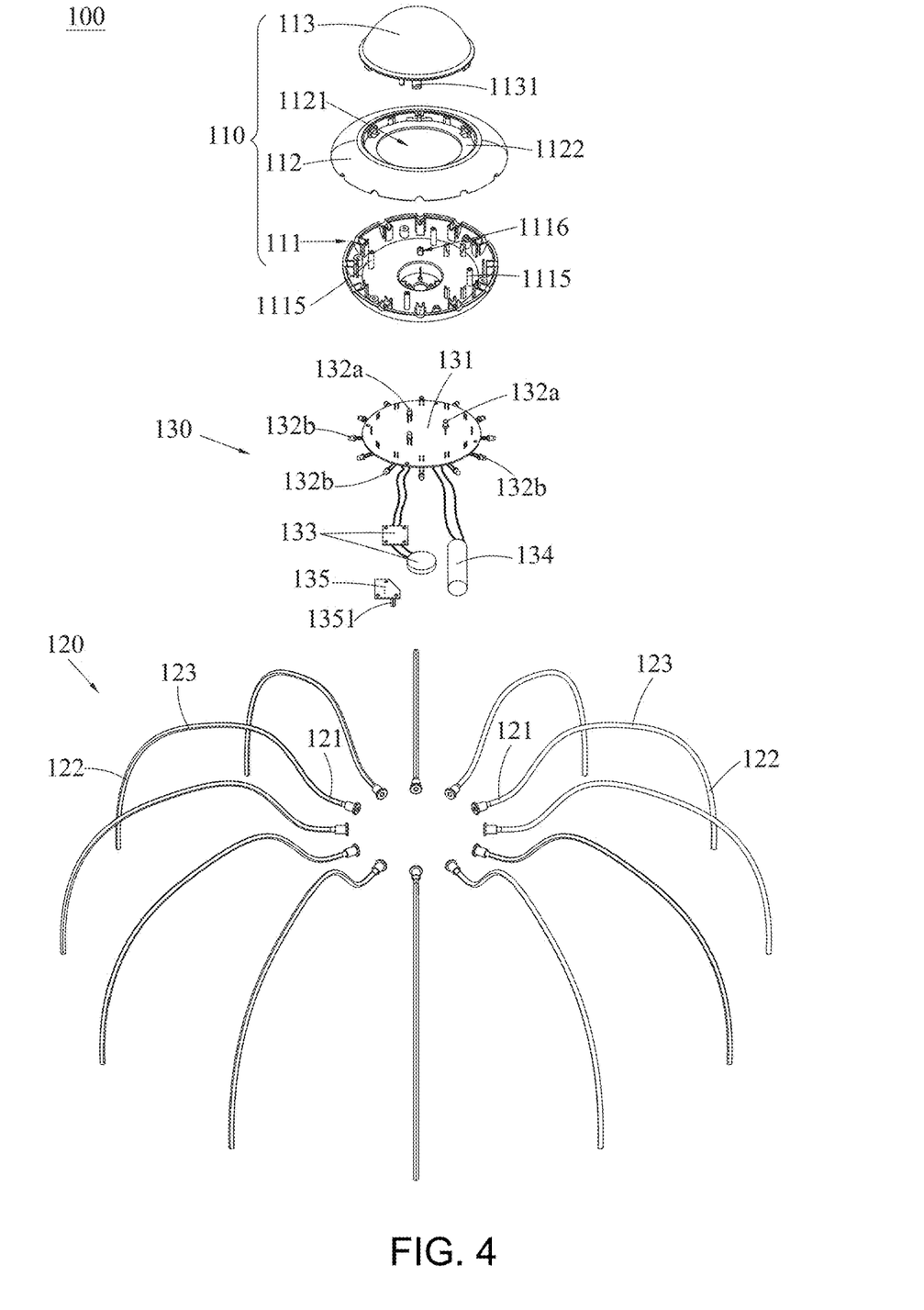
FIG. 4 is a further exploded view of FIG. 3.
Figure 8:
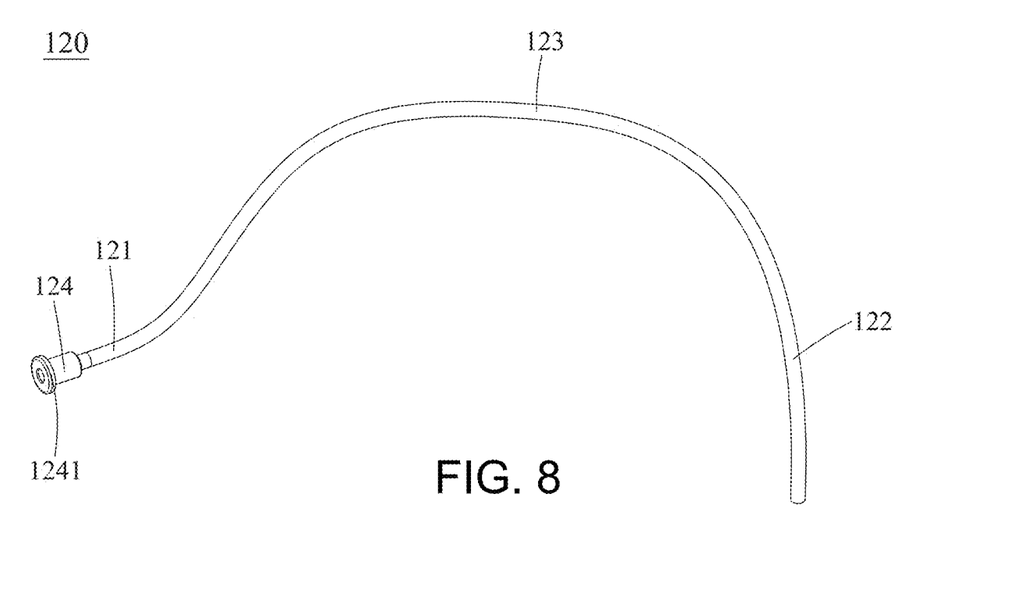
FIG. 8 is an enlarged view of the light guide bar in the present invention.

Referring to FIGS. 3 to 4 and FIG. 8, in this embodiment, the first end 121 of each light guide bar 120 is connected to a connector 124. Specifically, the connector 124 has an engagement part 1241 extending radially at one end. The end of the connector 124 with the engagement part 1241 is used to engage with the housing 110 and to accommodate the light-emitting components. The other end of the connector 124 is securely connected to the light guide bar 120. The connector 124 not only facilitates the installation of the flexible light guide bar 120 but also makes it easier to connect the light guide bar 120 with the light-emitting component, making the assembly of the pod light device 100 of the present invention more convenient.

Figure 9:
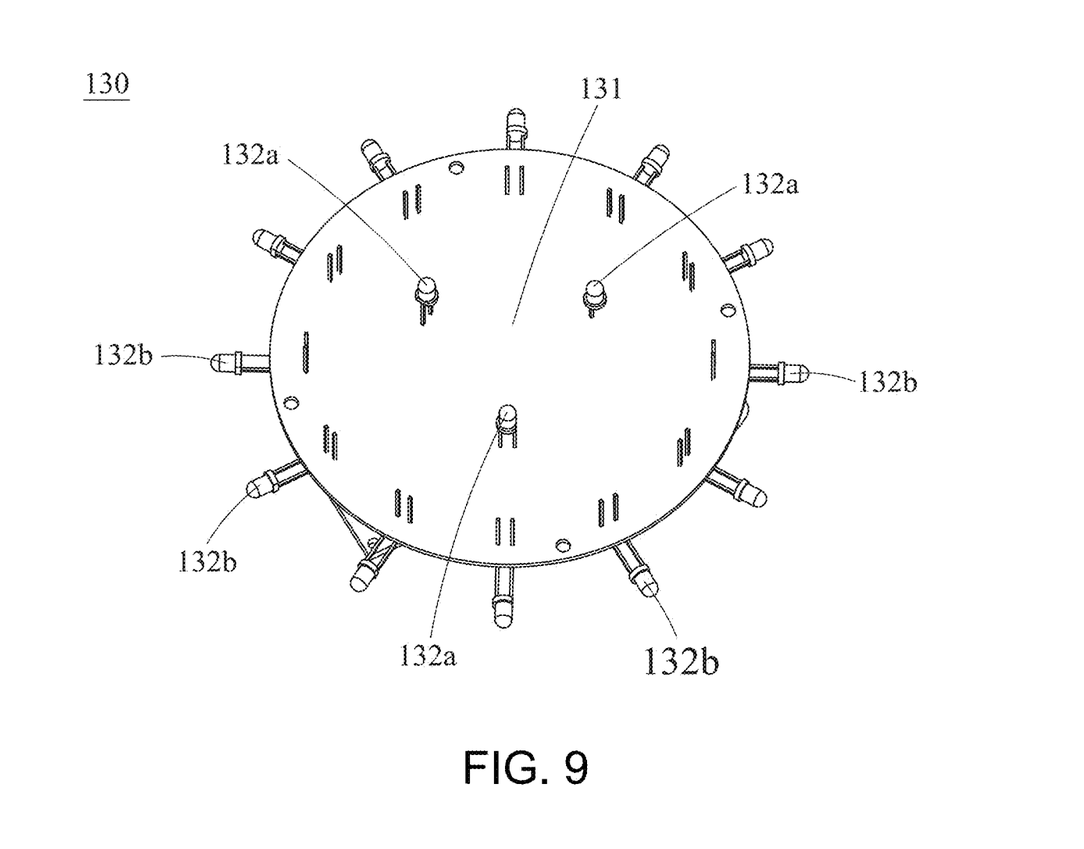
FIG. 9 is a structural diagram of the electronic assembly from another angle in FIG. 3.
Figure 10:
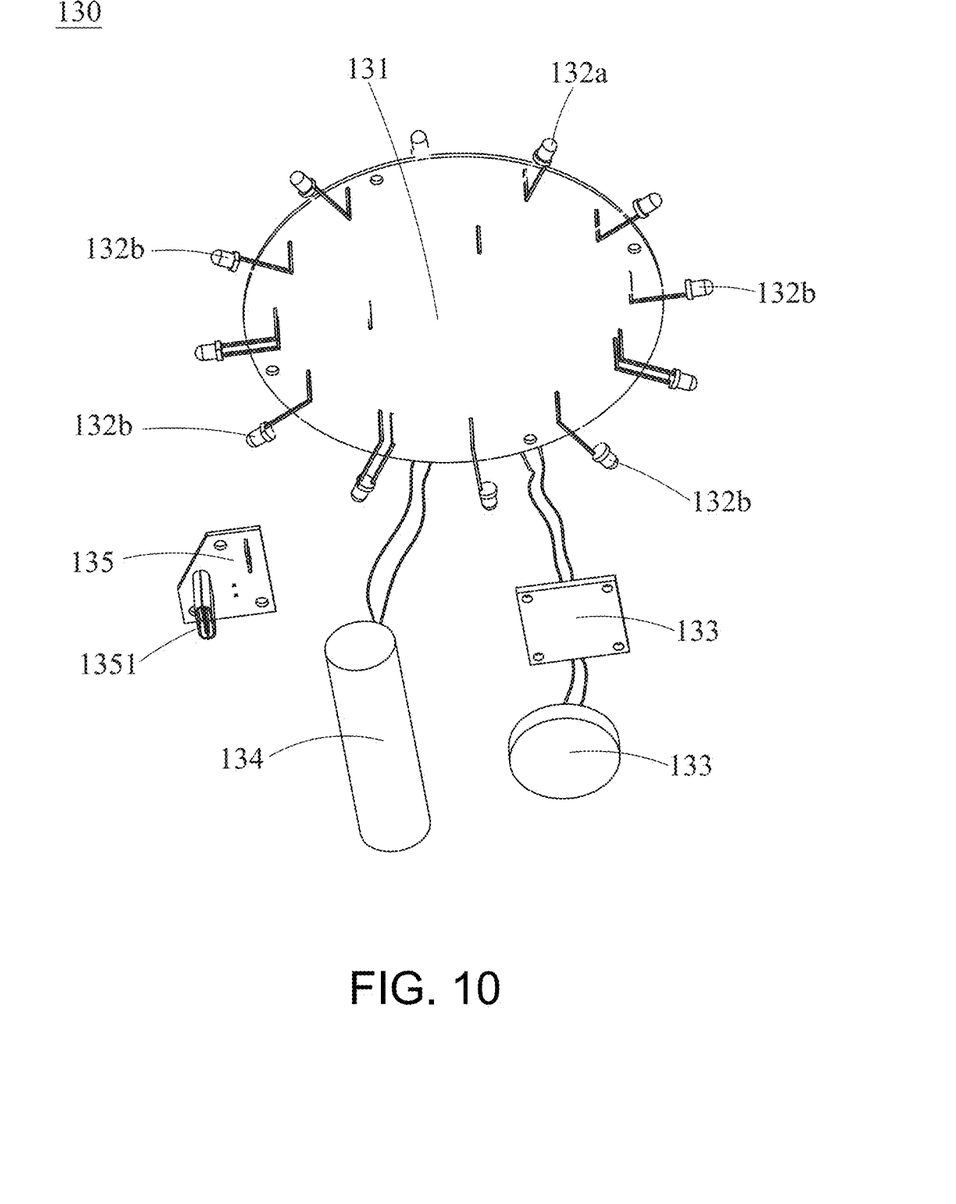
FIG. 10 is a structural diagram of the electronic assembly from yet another angle in FIG. 9.

Referring to FIGS. 3 to 4 and FIGS. 9 to 10, in one embodiment of the present invention, the light-emitting components include first light-emitting components 132a and second light-emitting components 132b. The first light-emitting components 132a are installed on the top plate of the main board 131 and are electrically connected to the main board 131. The second light-emitting components 132b are uniformly arranged along the radial direction of the main board 131 and are electrically connected to the main board 131, meaning that the second light-emitting components 132b are radially arranged on the main board 131. The number of first light-emitting components 132a and second light-emitting components 132b is not specifically limited. For example, in a specific embodiment, three first light-emitting components 132a are installed on the top surface of the main board 131, and twelve second light-emitting components 132b are uniformly arranged along the radial direction of the main board 131, as shown in FIGS. 9 and 10. After the electronic assembly 130 is installed inside the housing 110, the first light-emitting components 132a face the top of the housing 110, and the second light-emitting components 132b are located between the main board 131 and the inner wall of the housing 110, with each second light-emitting component 132b being housed in a connector 124 to connect with the light guide bar 120. In such a way, when the first light-emitting components 132a and the second light-emitting components 132b emit light, the light is transmitted from the top of the housing 110, and the light guide bars 120 produce a luminous effect.

In the present invention, the light-emitting components are preferably LED lights, which are not limited however. Other types of light-emitting components can also be used.

Referring to FIGS. 3 to 4 and FIGS. 9 to 10, in one embodiment of the present invention, the electronic assembly 130 further includes a sensor 133. The sensor 133 is housed inside the housing 110 and is electrically connected to the main board 131, for detecting at least one of vibration, sound, light, and image. The main board 131 is configured to control the first light-emitting components 132a and the second light-emitting components 132b to change the light-emitting mode based on the detection signal from the sensor 133, thereby increasing the fun.

In this embodiment, the sensor 133 includes at least one of a vibration sensor, a sound sensor, a photoelectric sensor, and a visual sensor. These sensors are housed within the housing 110 and electrically connected to the main board 131. Specifically, the vibration sensor is configured to detect vibrations of the support frame 200 and output detection signals to the main board 131. The sound sensor is configured to detect external sounds, the photoelectric sensor is configured to detect external light, and the visual sensor is configured to detect external images. The main board 131 is configured to control the light-emitting components to change their light-emitting modes based on the detection signals from at least one of these sensors. The light-emitting modes include, but are not limited to, on/off, color change, flashing patterns, and duration of light emission.

In a specific embodiment, a vibration sensor 133 is configured. The vibration sensor 133 is housed within the housing 110 and electrically connected to the main board 131, for detecting vibrations of the support frame 200 and outputting detection signals to the main board 131. Based on these signals, the main board 131 controls the first light-emitting components 132a and the second light-emitting components 132b to produce different light-emitting modes, such as turning on/off, changing colors, altering flashing patterns, or adjusting the duration of light emission. In this specific embodiment, under normal circumstances, the main board 131 controls the first and second light-emitting components 132a and 132b to emit green light. When an object is thrown into the receiving basket 230, it causes the support frame 200 to vibrate. Accordingly, the vibration sensor 133 detects this vibration and sends a signal to the main board 131, which then controls the first and second light-emitting components 132a and 132b to change to red light, thereby enhancing the fun of the games or sports.

Referring to FIGS. 3 to 4 and FIGS. 9 to 10, in one embodiment of the present invention, the electronic assembly 130 further includes a rechargeable battery 134 and a charging socket 135. The rechargeable battery 134 is housed within the housing 110 and electrically connected to the main board 131, for providing power to the main board 131 and the light-emitting components 132a and 132b. The rechargeable battery 134 has a battery life of several hours. The charging socket 135 is also housed within the housing 110 and electrically connected to the rechargeable battery 134, with its charging interface 1351 protruded outside the housing 110, which is convenient for charging. The use of a rechargeable battery 134 makes the luminous frame assembly 1 portable, enabling it to be easily carried to outdoor locations for games or sports, improving the practicality and convenience.

In a specific embodiment, the rechargeable battery 134 is a lithium battery, with at least one cell used. The charging interface 1351 of the charging socket 135 protrudes from the housing 110 and is a Type-C interface. The use of a Type-C interface facilitates easy charging of the rechargeable battery 134 through the charging interface 1351, making the use of the luminous frame assembly 1 more convenient.

In the present invention, the electronic assembly 130 further includes a switch button electrically connected to the main board 131. This switch button is protruded from the housing 110, allowing users to easily activate the light-emitting components 132a and 132b by pressing the button. The specific implementation of the switch button is a conventional method in the field and will not be described in detail.

Referring to FIGS. 3 to 7, in one embodiment of the present invention, the housing 110 includes a base 111, a middle cover 112, and a lampshade 113 connected in sequence. Each light guide bar 120 is engaged between the base 111 and the middle cover 112, and the main board 131 is also configured between the base 111 and the middle cover 112, with the first light-emitting components 132a facing the lampshade 113 and the second light-emitting components 132b configured within the connector 124 at the end of each light guide bar 120.

As shown in FIG. 3, in this embodiment, the connection position of the base 111 and the middle cover 112 is provided with multiple through holes 110a along the radial direction. Each light guide bar 120 is inserted through one of the through holes 110a. In a specific embodiment, twelve through holes 110a are evenly distributed along the radial direction of the housing 110, with each light guide bar 120 inserted through one of the through holes 110a and engaged between the base 111 and the middle cover 112.

Figure 6:
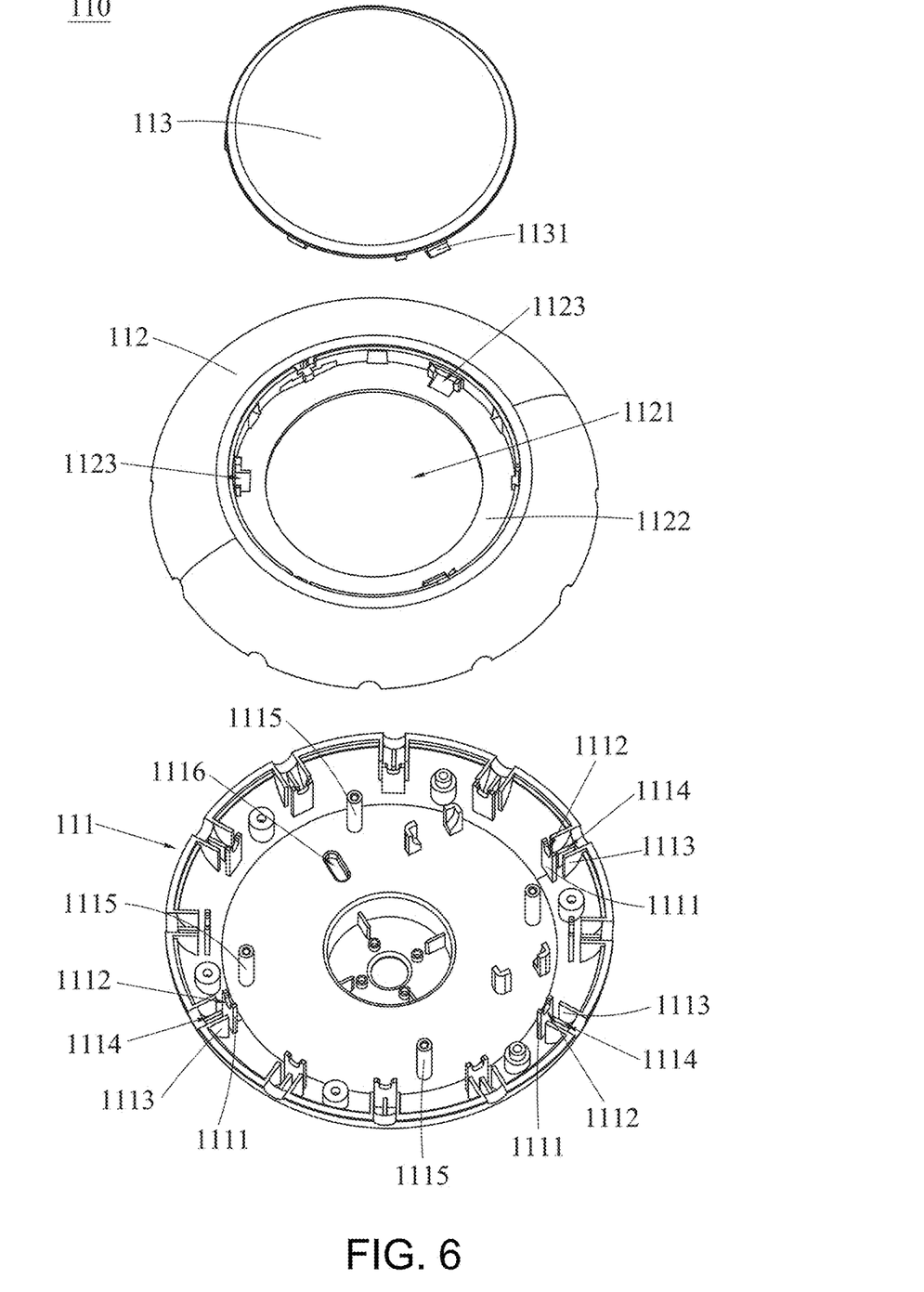
FIG. 6 is a structural diagram of the housing from another angle in FIG. 4.
Figure 7:
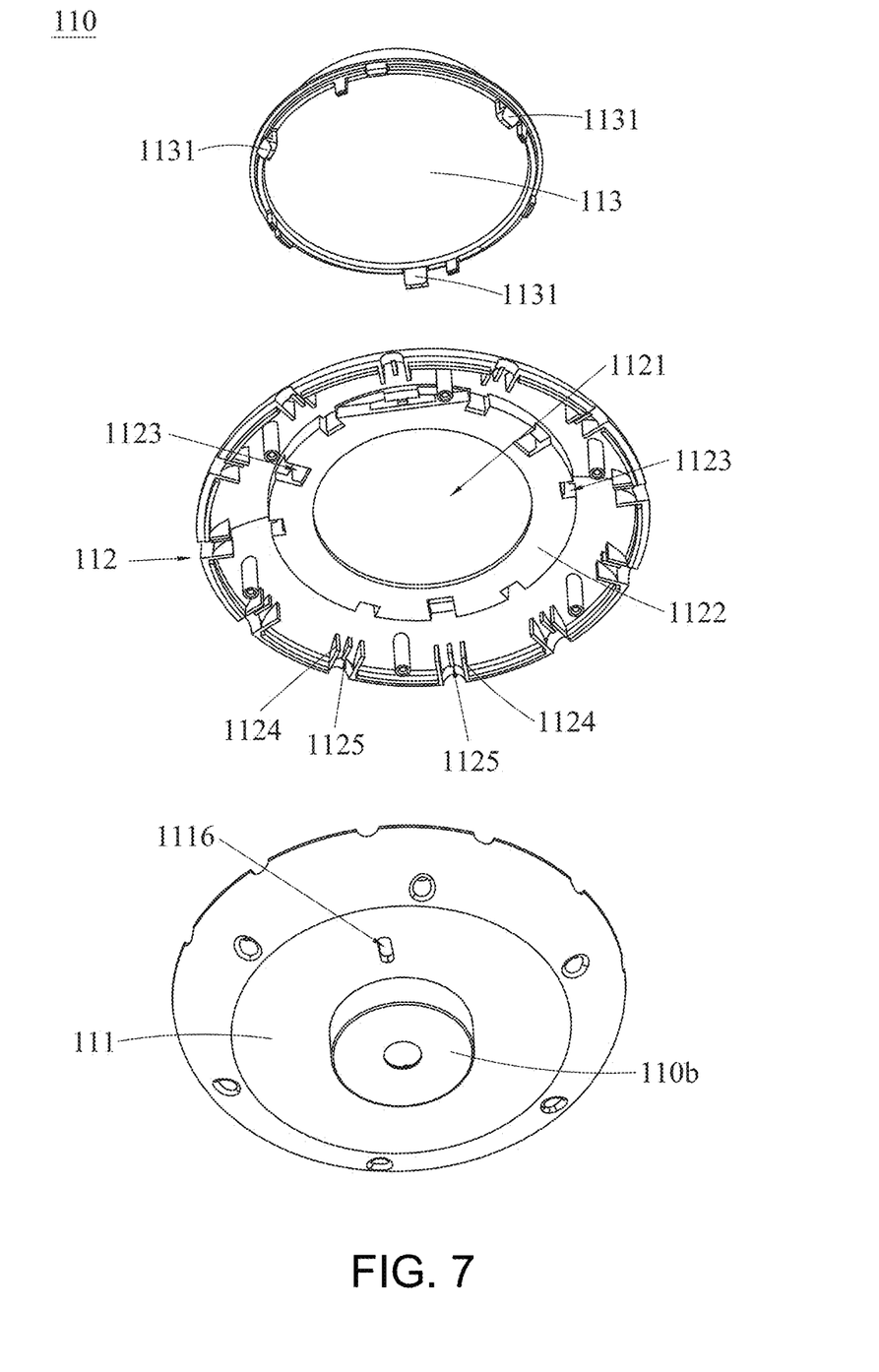
FIG. 7 is a structural diagram of the housing from yet another angle in FIG. 6.

Referring to FIGS. 6 and 7, in this embodiment, the base 111 is provided with multiple supports 1111 evenly distributed along its radial direction. Each support 1111 corresponds to one of the through holes 110a and is equipped with a groove 1112. The shape and size of the groove 1112 match the second light-emitting component 132b. After installation, the second light-emitting component 132b is engaged in the groove 1112 and supported by the support 1111. One end of the second light-emitting component 132b is protruded from the support 1111 and is housed within the connector 124 at the end of the light guide bar 120.

More specifically, the base 111 is further provided with multiple first mounting blocks 1113 evenly distributed along its radial direction. The first mounting blocks 1113 correspond to the supports 1111 and are spaced apart from them. Each first mounting block 1113 is equipped with a first groove 1114. The specific structure of the first mounting block 1113, whether it is a solid structure or made of plates, is not specifically limited as long as it can form the first groove 1114. In this embodiment, the shape and size of the first groove 1114 match the connector 124. After installation, the connector 124 is engaged in the first groove 1114 and supported by the first mounting block 1113. The engagement part 1241 of the connector 124 is engaged between the support 1111 and the first mounting block 1113, thus achieving stable connection of the connector 124 and the installation of the light guide bar 120.

As shown in FIG. 7, in this embodiment, the middle cover 112 is provided with multiple second mounting blocks 1124 on its bottom, each corresponding to one of the first mounting blocks 1113. Each second mounting block 1124 is provided with a second groove 1125 that corresponds to the first groove 1114. When the base 111 and the middle cover 112 are assembled, the connector 124 is engaged in the first groove 1114 and the second groove 1125, thereby achieving stable connection of the connector 124 through the cooperation of the first and second mounting blocks 1113 and 1124.

Referring again to FIGS. 6 and 7, in this embodiment, the base 111 is further provided with multiple support columns 1115, the number of which is not specifically limited. Additionally, the center of the middle cover 112 is provided with a through hole 1121, and the inner wall of the middle cover 112 is provided with a connecting plate 1122 that protrudes towards the center of the through hole 1121. The connecting plate 1122 forms a stepped structure with the top of the middle cover 112, as shown in FIG. 6. The main board 131 of the electronic assembly 130 is supported by the support columns 1115, and the vibration sensor 133, the rechargeable battery 134, and the charging socket 135 are all installed on the base 111 and located below the main board 131. After the base 111 and the middle cover 112 are assembled, the main board 131 is fixed between them, with the first light-emitting components 132a protruding through the through holes 1121 of the middle cover 112 to face the lampshade 113. The second light-emitting components 132b are arranged along the edge of the main board 131 and are housed within the connectors 124 at the ends of the light guide bars 120.

Figure 5:
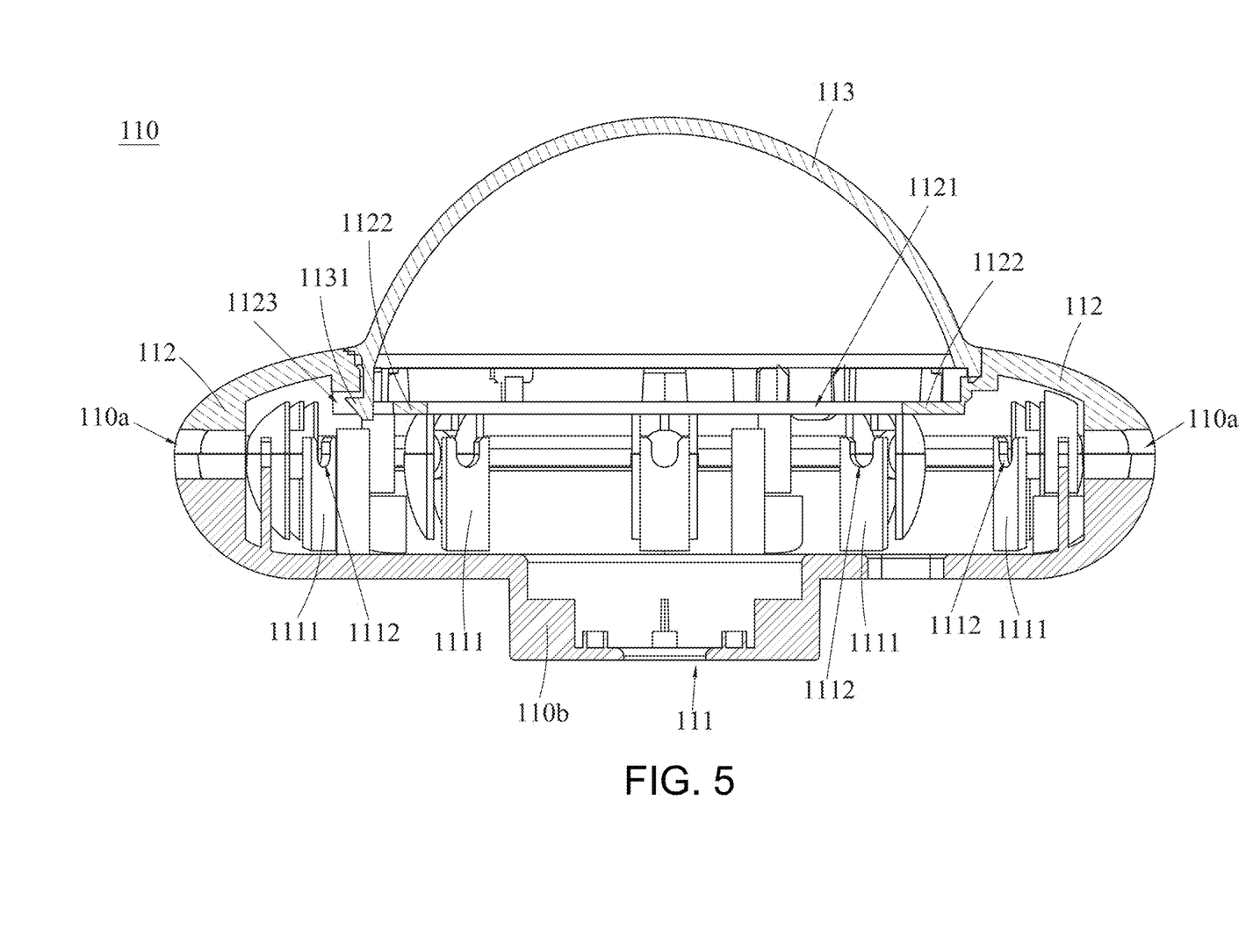
FIG. 5 is a sectional view of the housing in FIG. 3.

Referring to FIGS. 5 to 7, the inner wall of the middle cover 112 is further provided with engagement holes 1123. The lampshade 113 has an overall upwardly convex arcuate structure, and the bottom of the lampshade 113 is provided with engagement hooks 1131. The lampshade 113 is engaged with the middle cover 112 through the engagement hooks 1131 and the engagement holes 1123, as shown in FIG. 5, with the lampshade 113 covering the connecting plate 1122, thus achieving the connection between the lampshade 113 and the middle cover 112.

Referring to FIGS. 1 and 2, in one embodiment of the present invention, the support frame 200 includes a base frame 210, a support pole 220 installed on the base frame 210, a receiving basket 230 and a top frame 240 respectively installed on the support pole 220. Preferably, the support frame 200 further includes multiple chains 250 connected between the top frame 240 and the support pole 220, with the connection position of the chains 250 and the support pole 220 not lower than the receiving basket 230. In this invention, the housing 110 of the pod light device 100 is installed at the top of the support pole 220. Therefore, when the pod light device 100 is turned on, it not only illuminates the top of the support frame 200 but also illuminates the receiving basket 230 and the chains 250 through the light guide bars 120. This makes the receiving basket 230 clearly visible even in low-light or nighttime conditions, facilitating games or sports. When a flying disc or other thrown object hits the chains 250, the chains 250 block the object and guide it into the receiving basket 230. During this process, the impact of the thrown object causes the support frame 200 to vibrate. The vibration sensor 133 detects this vibration and sends a detection signal to the main board 131, which then controls the first and second light-emitting components 132a and 132b to change from green light to red light for example, thereby enhancing the fun of the game.

Referring to FIGS. 1, 2, and 7, in one embodiment of the present invention, the support pole 220 has a hollow structure at least at its top. The bottom of the housing 110 is provided with an insertion end 110b, which is inserted into the top of the support pole 220 and securely engaged with it, in this structural configuration, the assembly of the pod light device 100 is easy. Optionally, the installation of the pod light device 100 is not limited to this.

Referring to FIGS. 1 and 2, in one embodiment of the present invention, the receiving basket 230 includes a bottom 231 and a surrounding wall 232 protruding from the bottom 231, which together form a space for receiving the thrown objects. The middle of the bottom 231 is fixed to the support pole 220, thus positioning the receiving basket 230 around the support pole 220. Additionally, the top frame 240 includes multiple connecting rods 241 and an outer ring 242. The connecting rods 241 are arranged radially around the support pole 220 and are fixedly connected to the support pole 220, with the outer ring 242 connected to the outer edges of the connecting rods 241. The upper ends of the chains 250 are connected to the outer ring 242, and the lower ends of the chains 250 are fixed to the support pole 220, with the connection positions of the chains 250 and the support pole 220 being close to the bottom 231 of the receiving basket 230. The structure and arrangement of the receiving basket 230, top frame 240, and chain 250 are conventional in the field and will not be described in detail.

Figure 11:
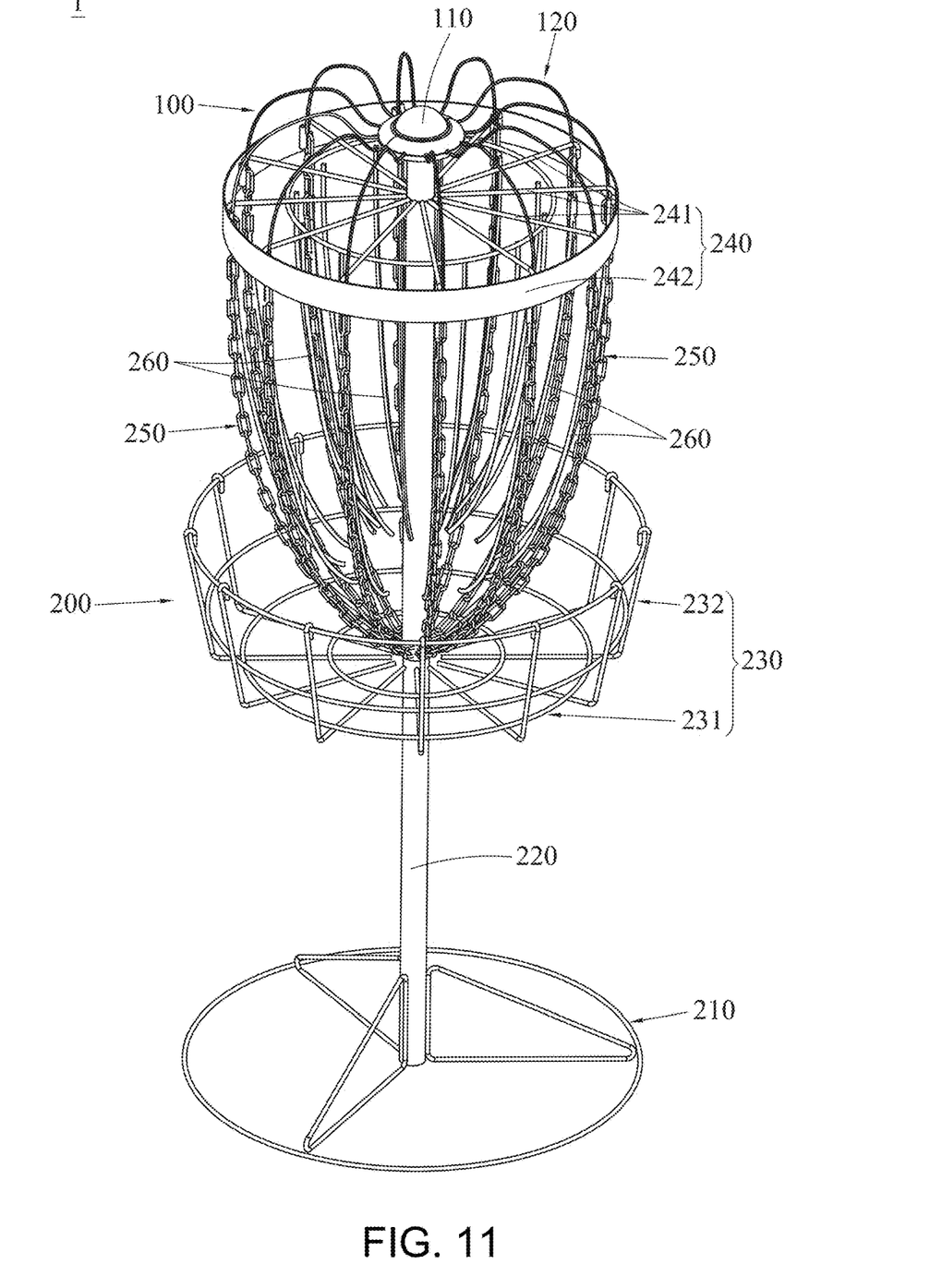
FIG. 11 is a structural diagram of the luminous frame assembly according to another embodiment of the present invention.

Referring to FIG. 11, in one embodiment of the present invention, the support frame 200 further includes multiple rods 260, which are arranged around the support pole 220. The upper end of each rod 260 is connected to the top frame 240, specifically to the connecting rods 241 or/and the outer ring 242, while the lower end of each rod 260 is fixed to the support pole 220. In this embodiment, the connection position of each rod 260 with the support pole 220 is higher than the connection position of the chain 250 with the support pole 220. The rods 260 are set up to further block the thrown objects, allowing smaller-diameter objects, such as balls, to fall into the receiving basket 230. With the dual blocking effect of the chains 250 and the rods 260, smaller objects can be effectively guided into the receiving basket 230, thus facilitating the collection of the thrown objects, and enhancing the fun of the games for users.

In the present invention, the structure of the base frame 210 is a conventional structure in the field and will not be described in detail.

In summary, the luminous frame assembly 1 of the present invention includes a support frame 200 and a pod light device 100 mounted at the top of the support frame 200. The pod light device 100 includes a housing 110, light guide bars 120, and an electronic assembly 130. The housing 110 has a hollow structure, and multiple light guide bars 120 are connected to the housing 110 at intervals along the radial direction. Each light guide bar 120 has at least one curved portion 123, and the end of each light guide bar 120, away from the housing 110, is bended downward, forming a drooping shape. The electronic assembly 130 includes a main board 131 and multiple light-emitting components 132a and 132b installed on the main board 131. The main board 131 and the light-emitting components 132a and 132b are housed within the housing 110, with some of the light-emitting components 132a facing the top of the housing 110 and others being connected to the respective light guide bars 120. When the light-emitting components 132a and 132b emit light, the light guide bars 120 produce a luminous effect, creating a unique and eye-catching visual effect. The light from the light guide bars 120 illuminates the receiving basket 230 and the chains 250 on the support frame 200, and the light is reflected by the chains 250, producing an eye-catching visual effect. In such a way, the luminous frame assembly 1 forms a clear target, enhancing the fun of games or sports, which is especially suitable for nighttime or low-light environments, thereby improving user experience and practicality.

Other parts of the structure of the support frame 200 involved in the present invention are conventional structures well-known to those of ordinary skill in the art and will not be described in detail here.

The above disclosure is only preferred embodiments of the present invention and cannot be used to limit the scope of rights of the present invention. Therefore, any equivalent changes made in accordance with the claims of the present invention are within the scope of the present invention.

What is claimed is:

1. A luminous frame assembly, comprising a support frame and a pod light device mounted at a top of the support frame, the pod light device comprising: a housing, which is of a hollow structure; light guide bars, connected to the housing at intervals along a radial direction of the housing, with each of the light guide bars having a first end, a second end, and at least one curved portion located between the first and second ends, the first end is connected to the housing, the second end is protruded downward away from the housing and facing the support frame; and an electronic assembly, comprising a main board and a plurality of first and second light-emitting components installed on the main board, the main board and the light-emitting components being housed within the housing, with the first light-emitting components facing a top of the housing and the second light-emitting components being connected to and facing the first ends of the light guide bars.

2. The luminous frame assembly according to claim 1, wherein the at least one curved portion is protruded upward from the housing.

3. The luminous frame assembly according to claim 1, wherein one end of each of the light guide bars is connected to a connector for accommodating the light-emitting components, the connector is provided with an engagement part extending radially, and the engagement part is engaged with the housing.

4. The luminous frame assembly according to claim 1, wherein the electronic assembly further comprises a sensor housed within the housing and electrically connected to the main board, the sensor is configured to detect at least one of vibration, sound, light, and image, and the main board is configured to control the light-emitting components to change a light-emitting mode based on a detection signal from the sensor.

5. The luminous frame assembly according to claim 1, wherein the electronic assembly further comprises a rechargeable battery and a charging socket, the rechargeable battery is housed within the housing and electrically connected to the main board, the charging socket is housed within the housing and electrically connected to the rechargeable battery, and a charging interface of the charging socket is exposed outside the housing.

6. The luminous frame assembly according to claim 1, wherein the housing comprises a base, a middle cover, and a lampshade connected in sequence, each of the light guide bars is engaged between the base and the middle cover, the main board is housed between the base and the middle cover, with some of the light-emitting components facing the lampshade.

7. The luminous frame assembly according to claim 6, wherein a connection position of the base and the middle cover is provided with a plurality of through holes along the radial direction, each of the light guide bars is inserted through a respective through hole.

8. The luminous frame assembly according to claim 6, wherein the base is provided with a plurality of supports evenly distributed along the radial direction, each of the supports is provided with a groove in which each of the light-emitting components is engaged, one end of each of the light-emitting components is protruded from the support and connected to the light guide bar.

9. The luminous frame assembly according to claim 1, further comprising a bottom support frame, a support pole mounted on the bottom support frame, a receiving basket and a top support frame respectively mounted on the support pole, and a plurality of chains connected between the top support frame and the support pole, wherein a connection position between the chains and the support pole is not lower than the receiving basket, and the housing is mounted at a top of the support pole.

10. The luminous frame assembly according to claim 9, wherein at least a top of the support pole is hollow, a bottom of the housing is protruded with an insertion end, with the insertion end being inserted into the top of the support pole and tightly fitted therewith.

\* \* \* \* \*